(12) United States Patent
Laplante

(10) Patent No.: US 10,955,006 B2
(45) Date of Patent: Mar. 23, 2021

(54) RADIAL SHAFT SEAL WITH DYNAMIC EXCLUSION OF CONTAMINATION

(71) Applicant: Freudenberg-NOK General Partnership, Plymouth, MI (US)

(72) Inventor: Robert P. Laplante, Gilford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 184 days.

(21) Appl. No.: 15/993,096

(22) Filed: May 30, 2018

(65) Prior Publication Data
US 2019/0368612 A1 Dec. 5, 2019

(51) Int. Cl.
| | |
|---|---|
| *F16J 15/447* | (2006.01) |
| *F16J 15/3264* | (2016.01) |
| *F16C 33/80* | (2006.01) |
| *F16C 33/78* | (2006.01) |
| *F16J 15/3244* | (2016.01) |
| *F16J 15/3204* | (2016.01) |
| *F16J 15/3232* | (2016.01) |

(52) U.S. Cl.
CPC ........ *F16C 33/7883* (2013.01); *F16C 33/805* (2013.01); *F16J 15/3264* (2013.01); *F16J 15/4476* (2013.01); *F16J 15/3204* (2013.01); *F16J 15/3232* (2013.01); *F16J 15/3244* (2013.01)

(58) Field of Classification Search
CPC .... F16J 15/3256; F16J 15/3264; F16J 15/447; F16J 15/4472; F16J 15/4474; F16J 15/4476; F16J 15/4478; F16C 33/7883; F16C 33/805
See application file for complete search history.

(56) References Cited

U.S. PATENT DOCUMENTS

| | | | |
|---|---|---|---|
| 3,256,027 A | * | 6/1966 | Chapel ................... F16J 15/164 |
| | | | 277/426 |
| 3,455,564 A | | 7/1969 | Dega |
| 3,561,770 A | | 2/1971 | Corsi et al. |
| 4,037,848 A | | 7/1977 | Prescott et al. |
| 4,037,849 A | | 7/1977 | Thumm |
| 4,114,897 A | | 9/1978 | Bainard |
| 4,126,317 A | | 11/1978 | Bainard |
| 4,206,009 A | | 6/1980 | Kazares |

(Continued)

FOREIGN PATENT DOCUMENTS

JP 2005098417 A * 4/2005 .......... F16C 33/7883

*Primary Examiner* — Nicholas L Foster
(74) *Attorney, Agent, or Firm* — Daniel J. Sepanik, Esq.; Harness, Dickey & Pierce, P.L.C.

(57) ABSTRACT

A sealing arrangement includes a housing including a bore and a shaft extending through the bore in the housing. An inner annular sealing member includes an inner surface press fit on the shaft and having a plurality of radially outwardly projecting fins on an outer surface. An outer annular sealing member is press fit in the bore and includes a first end supporting a seal lip that sealingly engages an outer surface of the inner annular sealing member. The outer annular sealing member includes a second end that is disposed directly radially outward of and spaced from the radially outwardly projecting fins of the inner annular sealing member. When the shaft rotates, the radially outwardly projecting fins pro-actively/dynamically move air, contamination, particles, fluids etc. axially away from the sealing area.

10 Claims, 9 Drawing Sheets

(56) References Cited

U.S. PATENT DOCUMENTS

| | | | | |
|---|---|---|---|---|
| 4,252,329 | A | 2/1981 | Messenger | |
| 4,327,924 | A | 5/1982 | Wheeler | |
| 4,428,587 | A * | 1/1984 | Forch | F16J 15/008 |
| | | | | 277/424 |
| 4,432,557 | A | 2/1984 | Drucktenhengst | |
| 4,808,012 | A * | 2/1989 | Otto | F16C 33/7813 |
| | | | | 277/348 |
| 4,856,794 | A | 8/1989 | Boyers et al. | |
| 4,906,009 | A * | 3/1990 | Saitoh | F16J 15/3232 |
| | | | | 277/349 |
| 4,928,979 | A | 5/1990 | Nagasawa | |
| 4,936,591 | A | 6/1990 | Romero | |
| 4,962,936 | A * | 10/1990 | Matsushima | F16J 15/3256 |
| | | | | 277/364 |
| 4,992,023 | A | 2/1991 | Baker et al. | |
| 5,002,287 | A | 3/1991 | Eskilsson | |
| 5,082,294 | A | 1/1992 | Toth et al. | |
| 5,186,472 | A | 2/1993 | Romero et al. | |
| 5,201,528 | A | 4/1993 | Upper | |
| 5,269,536 | A * | 12/1993 | Matsushima | F16J 15/3256 |
| | | | | 277/349 |
| 5,286,038 | A | 2/1994 | Abraham et al. | |
| RE35,309 | E * | 8/1996 | Matsushima | F16J 15/3264 |
| | | | | 277/351 |
| 5,553,870 | A * | 9/1996 | Czekansky | B60B 35/121 |
| | | | | 277/559 |
| 5,895,052 | A * | 4/1999 | Drucktenhengst | F16J 15/3256 |
| | | | | 277/351 |
| 6,168,165 | B1 | 1/2001 | Sabo | |
| 6,170,833 | B1 | 1/2001 | Cox et al. | |
| 6,357,751 | B1 | 3/2002 | Rentschler et al. | |
| 6,450,503 | B1 * | 9/2002 | Dossena | F16J 15/3256 |
| | | | | 277/549 |
| 6,513,812 | B1 | 2/2003 | Yang et al. | |
| 6,561,519 | B1 | 5/2003 | Frese et al. | |
| 7,594,664 | B2 * | 9/2009 | Maskaliunas | F16J 15/322 |
| | | | | 277/551 |
| 7,624,989 | B2 * | 12/2009 | Hartmann | F16J 15/3264 |
| | | | | 277/346 |
| 7,950,670 | B2 * | 5/2011 | Maskaliunas | F16J 15/322 |
| | | | | 277/353 |
| 7,959,158 | B2 * | 6/2011 | Sanada | F16J 15/3256 |
| | | | | 277/551 |
| 8,016,293 | B2 * | 9/2011 | Voydatch | F16J 15/3264 |
| | | | | 277/551 |
| 8,240,674 | B2 * | 8/2012 | Hartmann | F16J 15/3264 |
| | | | | 277/409 |
| 8,336,886 | B2 * | 12/2012 | Berdichevsky | F16J 15/3264 |
| | | | | 277/572 |
| 8,403,333 | B2 * | 3/2013 | Berdichevsky | F16J 15/164 |
| | | | | 277/353 |
| 9,358,833 | B2 * | 6/2016 | Gulli | F16J 15/3264 |
| 9,914,326 | B2 * | 3/2018 | White | B60B 27/0073 |
| 9,956,820 | B2 * | 5/2018 | Gulli | B60B 27/0073 |
| 9,995,396 | B1 * | 6/2018 | Maskaliunas | F16J 15/3232 |
| 10,208,801 | B1 * | 2/2019 | Wang | F16C 33/7823 |
| 10,260,635 | B2 * | 4/2019 | Tanida | F16J 15/002 |
| 10,344,868 | B2 * | 7/2019 | Jarosinski | F16J 15/3496 |
| 2003/0184021 | A1 | 10/2003 | Hatch et al. | |
| 2004/0150168 | A1 | 8/2004 | Heathcott et al. | |
| 2006/0012129 | A1 | 1/2006 | Oldenburg | |
| 2007/0085276 | A1 * | 4/2007 | Hartmann | F16C 33/80 |
| | | | | 277/349 |
| 2007/0222161 | A1 * | 9/2007 | Voydatch | F16J 15/164 |
| | | | | 277/551 |
| 2008/0054572 | A1 | 3/2008 | Maskaliunas | |
| 2008/0128997 | A1 * | 6/2008 | Berdichevsky | F16J 15/164 |
| | | | | 277/366 |
| 2008/0145254 | A1 * | 6/2008 | Sanada | F16J 15/164 |
| | | | | 418/55.4 |
| 2010/0052265 | A1 * | 3/2010 | Hartmann | F16J 5/3264 |
| | | | | 277/424 |
| 2010/0219587 | A1 * | 9/2010 | Wang | F16J 15/3264 |
| | | | | 277/411 |
| 2011/0006485 | A1 * | 1/2011 | Nakagawa | F16J 15/164 |
| | | | | 277/549 |
| 2012/0068419 | A1 * | 3/2012 | Berdichevsky | F16J 15/164 |
| | | | | 277/549 |
| 2013/0087978 | A1 * | 4/2013 | Nakagawa | F16J 15/164 |
| | | | | 277/349 |
| 2014/0239597 | A1 * | 8/2014 | White | B60B 27/0073 |
| | | | | 277/352 |
| 2015/0098670 | A1 * | 4/2015 | Gulli | F16J 15/3264 |
| | | | | 384/486 |
| 2016/0236509 | A1 * | 8/2016 | Gull | B60B 27/0073 |
| 2018/0045318 | A1 * | 2/2018 | Tanida | F16J 15/002 |
| 2018/0163872 | A1 * | 6/2018 | Maskaliunas | F16J 15/3232 |
| 2018/0163873 | A1 * | 6/2018 | Jarosinski | F16J 15/3256 |

\* cited by examiner

RADIAL SHAFT SEAL WITH DYNAMIC EXCLUSION OF CONTAMINATION

FIELD

The present disclosure relates to a radial shaft seal with dynamic exclusion of contamination.

BACKGROUND

This section provides background information related to the present disclosure which is not necessarily prior art.

Automotive vehicles and other industrial machines often include rotary shafts that are at least partially received in and rotate relative to a stationary housing. Examples of such arrangements are found in conventional transmissions and axle assemblies. It is necessary to provide a seal at the interface between the shaft and the housing. Sealing the interface is necessary because under many driving conditions, especially during rain, large amounts of contaminants are present that could enter into the interface between the shaft and the housing and cause eventual problems. Conventional sealing arrangements typically include a rubber lip seal to prevent contaminants from entering into the system. Further, the rubber lip seals are used to keep lubricant from exiting the system.

There are several problems with conventional rubber lip seals. First, rubber lip seals tend to wear out in an undesirable fashion. The rotary shafts on most vehicles rotate at very high speeds and the constant contact between the rotating shaft and the rubber lip seal causes the seal to wear. Furthermore, the presence of contaminants along the contact area between the shaft and the rubber lip seal often cause significant wear on the seal, which results in a short seal life.

A further problem exists in that the rotary shafts have some radial and axial movement relative to the housing. With conventional lip seals, such movement is not compensated for and, a proper seal is not maintained. Under these conditions, it is more likely that outside contaminants will enter into the shaft and housing interface, and, moreover, become lodged between the lip seal and the shaft which results in faster wear-out of the seal.

SUMMARY

This section provides a general summary of the disclosure, and is not a comprehensive disclosure of its full scope or all of its features.

According to a first aspect of the present disclosure, a sealing arrangement includes a housing including a bore and a shaft extending through the bore in the housing. An inner annular sealing member includes an inner surface press fit on the shaft and having a plurality of radially outwardly projecting fins on an outer surface. An outer annular sealing member is press fit in the bore and includes a first end supporting a seal lip that sealingly engages an outer surface of the inner annular sealing member. The outer annular sealing member can include a second end that is disposed directly radially outward of and spaced from the radially outwardly projecting fins of the inner annular sealing member. When the shaft rotates, the radially outwardly projecting fins pro-actively/dynamically move air, contamination, particles, fluids etc. axially away from the sealing area.

According to a second aspect of the present disclosure, a sealing arrangement includes a housing including a bore and a shaft extending through the bore in the housing. An inner annular sealing member has an inner surface press fit on the shaft. An outer annular sealing member press fit in the bore and having a first end supporting a seal lip that sealingly engages an outer surface of the inner annular sealing member. A labyrinth structure is defined by the inner annular sealing member and the outer annular sealing member.

According to a third aspect of the present disclosure, a sealing arrangement includes a housing including a bore and a shaft extending through the bore in the housing. An inner annular sealing member has an inner surface press fit on the shaft and an outer annular sealing member is press fit in the bore and has a first end supporting a seal lip that sealingly engages an outer surface of the inner annular sealing member. A labyrinth structure is defined by the inner annular sealing member and the outer annular sealing member, wherein the labyrinth structure includes a first axially protruding annular portion extending from a seal body of the outer annular sealing member and a second axially protruding annular portion extending from the inner annular sealing member, wherein the first axially protruding annular portion is disposed directly radially inward from the second axially protruding annular portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
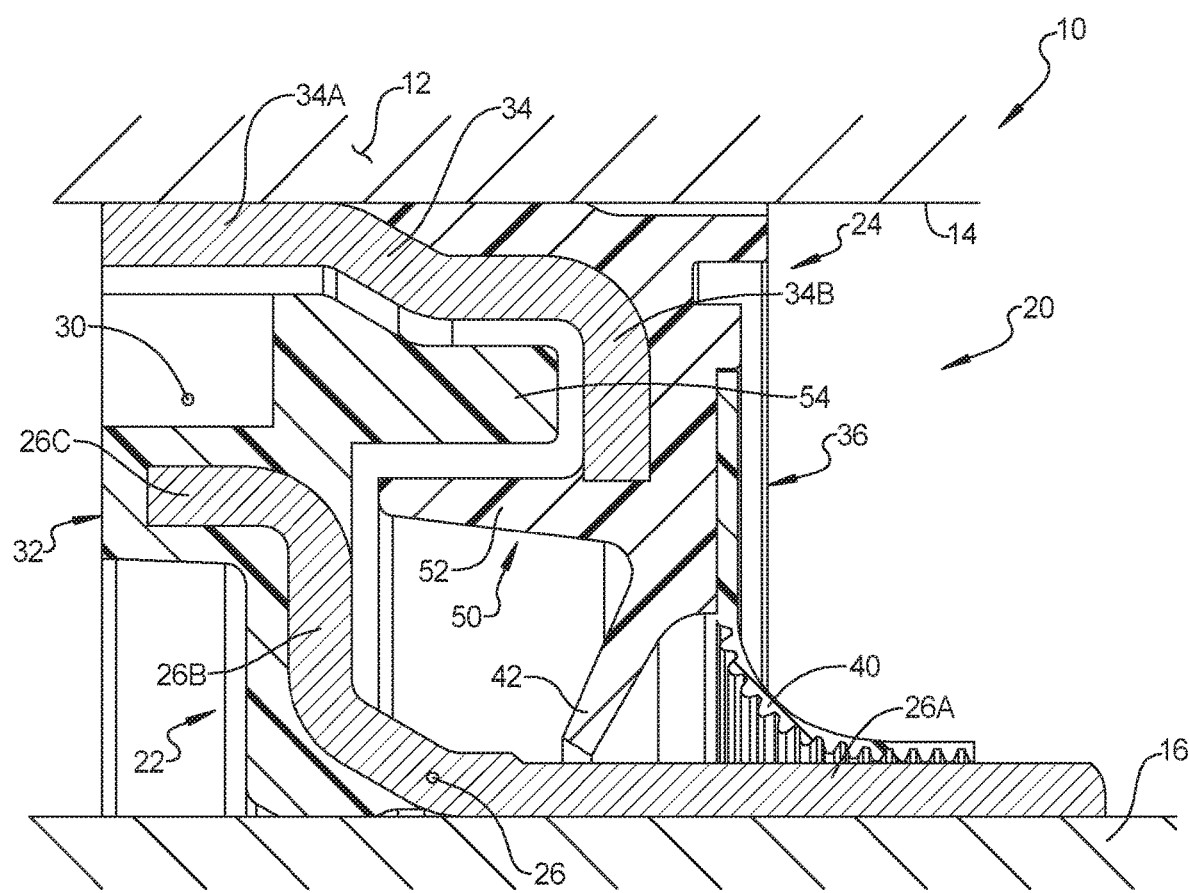
FIG. 1 is a cross-sectional view of a radial shaft seal arrangement with dynamic exclusion of contamination according to the principles of the present disclosure.
Figure 2:
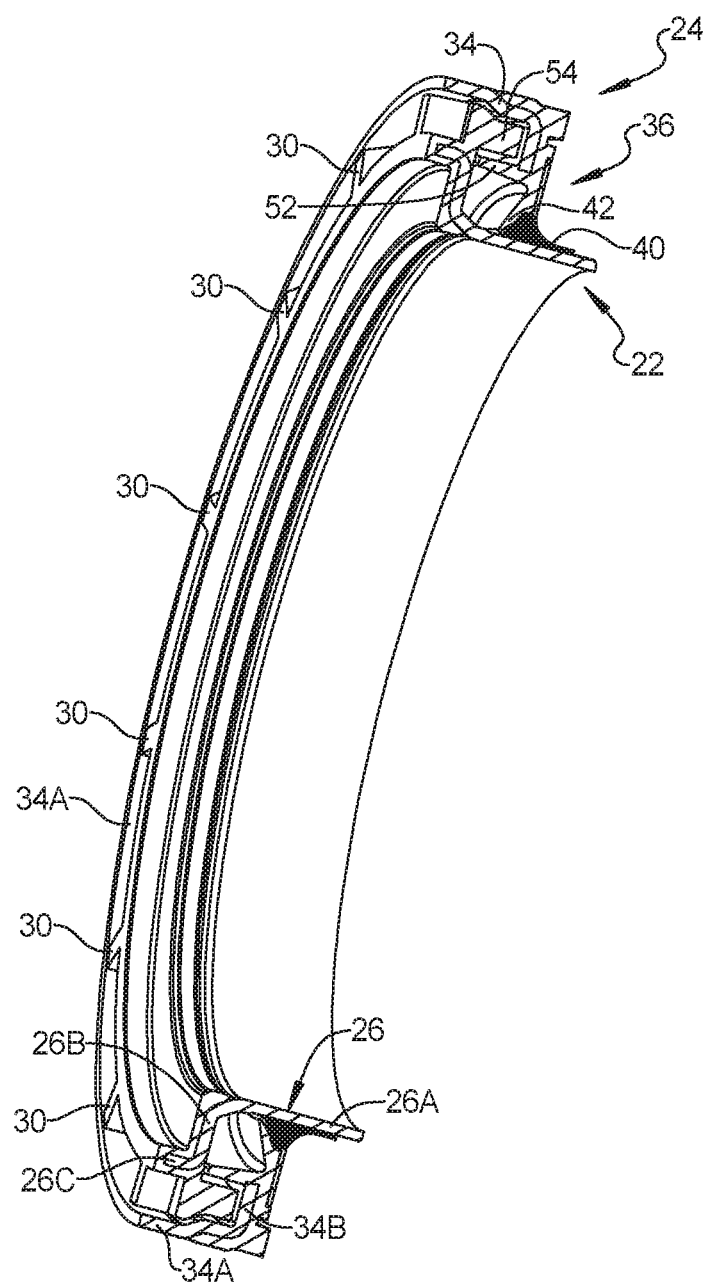
FIG. 2 is a perspective partial cross-sectional view of a radial shaft seal with dynamic exclusion of contamination.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a sealing arrangement 10 is shown including a housing 12 defining a bore 14 and a shaft 16 received within the bore 14. A seal assembly 20 is disposed in a gap between the shaft 16 and the bore 14. The seal assembly 20 includes an inner annular sealing member 22 and an outer annular sealing member 24.

The inner annular sealing member 22 includes a metal insert 26 having an inner surface 28 press fit on the shaft 16. The metal insert 26 can include a first cylindrical portion 26A, a radially outwardly extending step region 26B and a second cylindrical portion 26C extending axially from an outer end of the radially outwardly extending step region 26B in an opposite direction than the first cylindrical portion 26A. A plurality of radially outwardly projecting fins 30 are provided on an outer surface of the second cylindrical portion 26C. The radially outwardly projecting fins 30 can be formed by an elastomeric over mold 32 provided on the second cylindrical portion 26C.

The outer annular sealing member 24 can include a metal insert 34 having a cylindrical portion 34A that can be press fit within the bore 14 of the housing 12. A radially inwardly extending portion 34B can extend radially inward from an end of the cylindrical portion 34A and can support a seal body 36 having one or more seal lips 40, 42 that sealingly engage an outer surface of the first cylindrical portion 26A of the inner annular sealing member 22. The cylindrical portion 34A of the outer annular sealing member 24 is disposed directly radially outward of and spaced from the radially outwardly projecting fins 30 of the inner annular sealing member 22. The seal body 36 can be made from an elastomer that is over-molded on the metal insert 34 and can include a dust lip 42 integrally formed therewith and a main seal lip 40 formed as a disk-shape and adhered to the seal body 36 and including spiral grooves on a lay-down surface that engages the first cylindrical portion 26A. The main seal lip 40 can be made from PTFE or other material. Alternatively, the main seal lip 40 can be integrally formed with the seal body 36.

When the shaft 16 rotates, the radially outwardly projecting fins 30 pro-actively/dynamically move air, contamination, particles, fluids etc. axially away from the sealing area. The inner annular sealing member 22 and the outer annular sealing member 24 can further define a labyrinth structure 50. The labyrinth structure 50 can include a first axially protruding annular portion 52 extending from the seal body 36 and that is disposed radially inward of a second axially protruding annular portion 54 extending from the inner annular sealing member 22. The labyrinth structure 50 is disposed between the radially outwardly projecting fins 30 and the seal lips 40, 42. It should be understood that the seal body 36, the seal lips 40, 42 and the labyrinth structure 50 can take on other forms.

Figure 3:
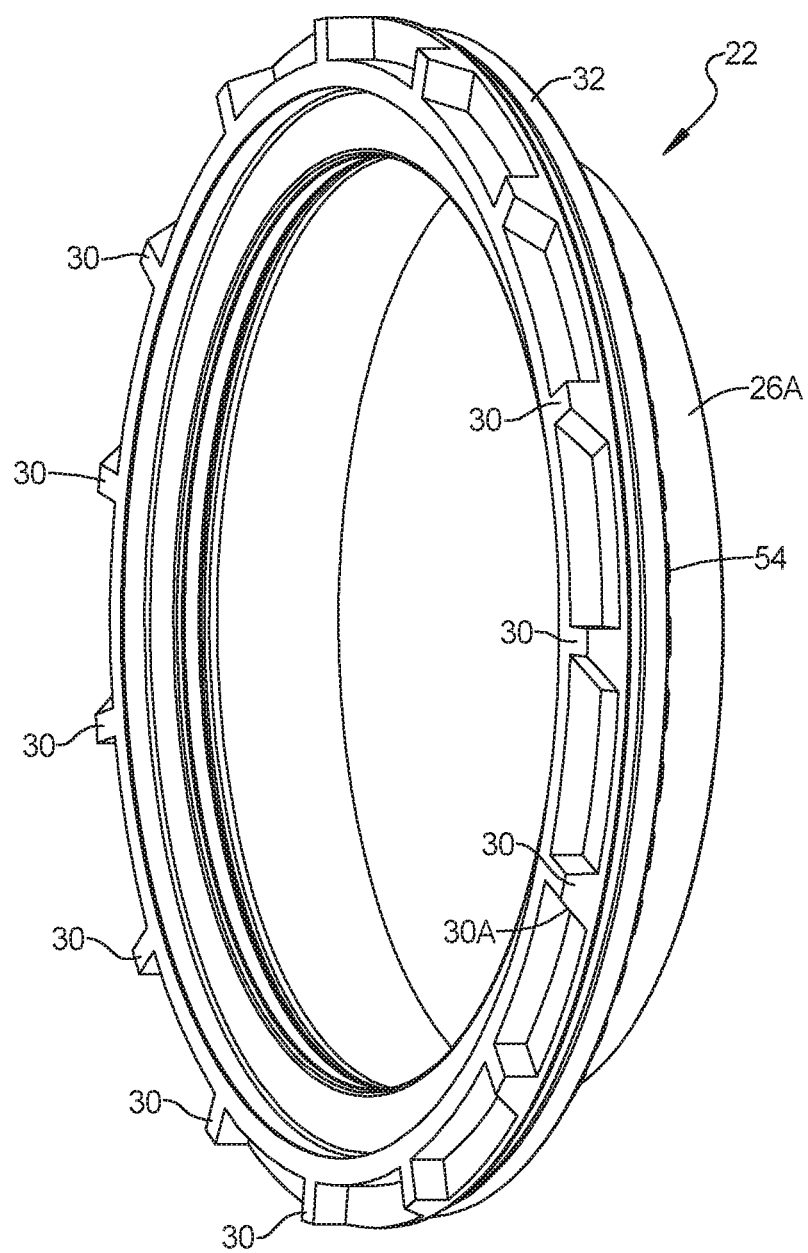
FIG. 3 is a perspective view of an inner annular sealing member with unidirectional fins.

As shown in FIG. 3, the radially outwardly projecting fins 30 can be formed as unidirectional fins which are designed for rotation in a single direction and are configured to dynamically move air, contaminants, particles and fluids axially away from the sealing area. In particular, the fins 30 have an angled forward surface 30A to deflect and move air and contaminants away from the sealing region.

Figure 4:
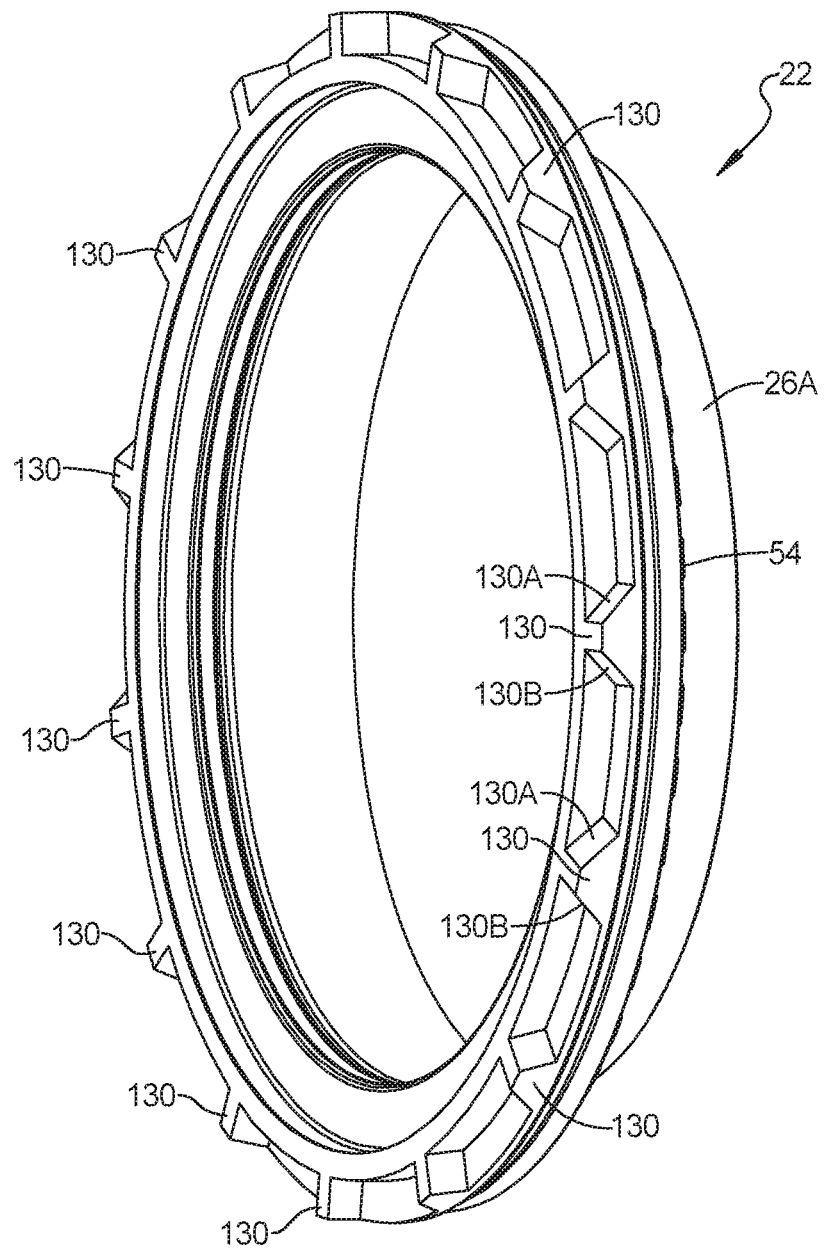
FIG. 4 is a perspective view of an inner annular sealing member with bidirectional fins.
Figure 9:
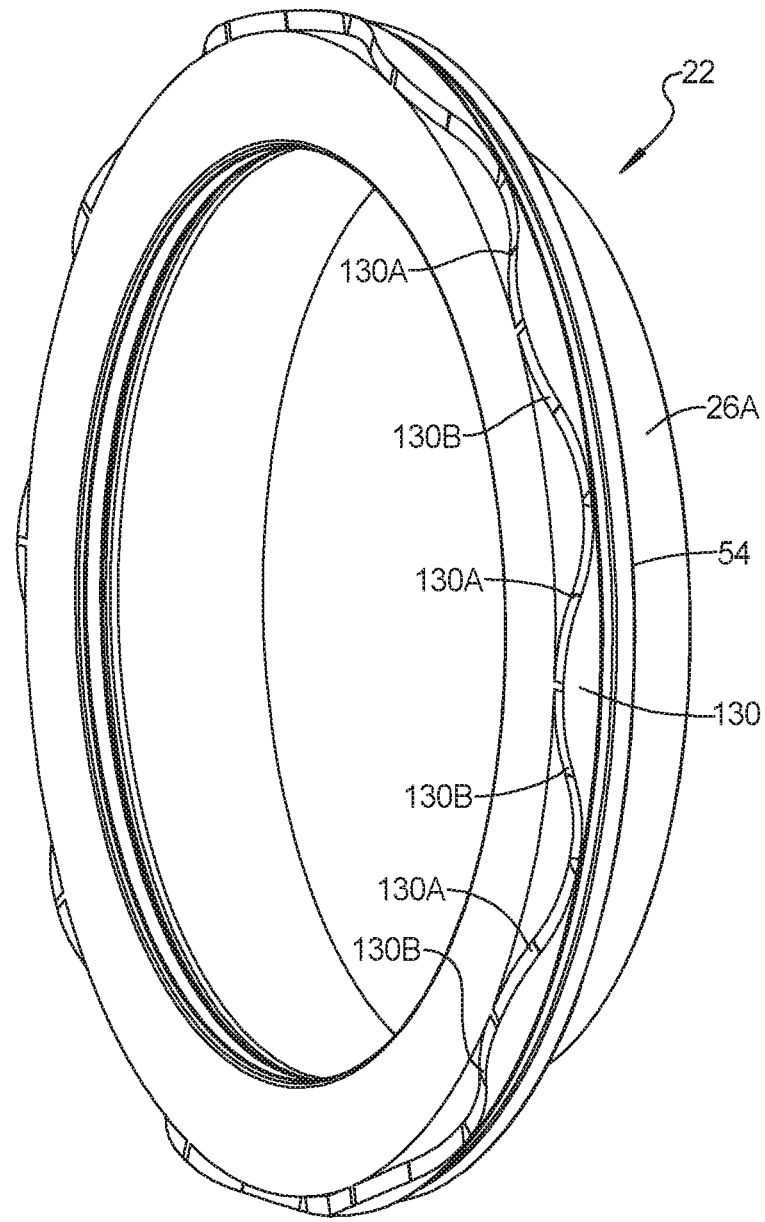
FIG. 9 is a perspective view of an inner annular sealing member with bidirectional sine wave-shaped fins.

Alternatively, as shown in FIG. 4, the radially outwardly projecting fins 130 can be formed as bidirectional fins which are designed for rotation in either direction and are configured to dynamically move air, contaminants, particles and fluids axially away from the sealing area regardless of the rotational direction of the shaft 16. In particular, the fins 130 have angled forward and rearward surfaces 130A, 130B to deflect and move air and contaminants away from the sealing region regardless of the rotation direction of the shaft 16. As a further alternative as shown in FIG. 9, the fins 130' can be formed as a sine wave and can include forward and rearward surfaces 130A', 130B' to deflect and move air and contaminants away from the sealing region regardless of the rotation direction of the shaft 16.

The geometry of the fins 30, 130, 130' can be set to target unidirectional and bidirectional rotation and can also be utilized and/or combined with other geometries such as labyrinths, areas of restriction, contacting, non-contacting geometries etc. to promote intended functions. The leading and trailing surfaces 30A; 130A, 130B can be adjusted to modify flow velocity and direction (i.e.: angles, shape, configuration etc.) The sealing arrangement provides improved exclusion protection without increasing parasitic power losses often associated with standard contacting exclusion systems.

Figure 5:
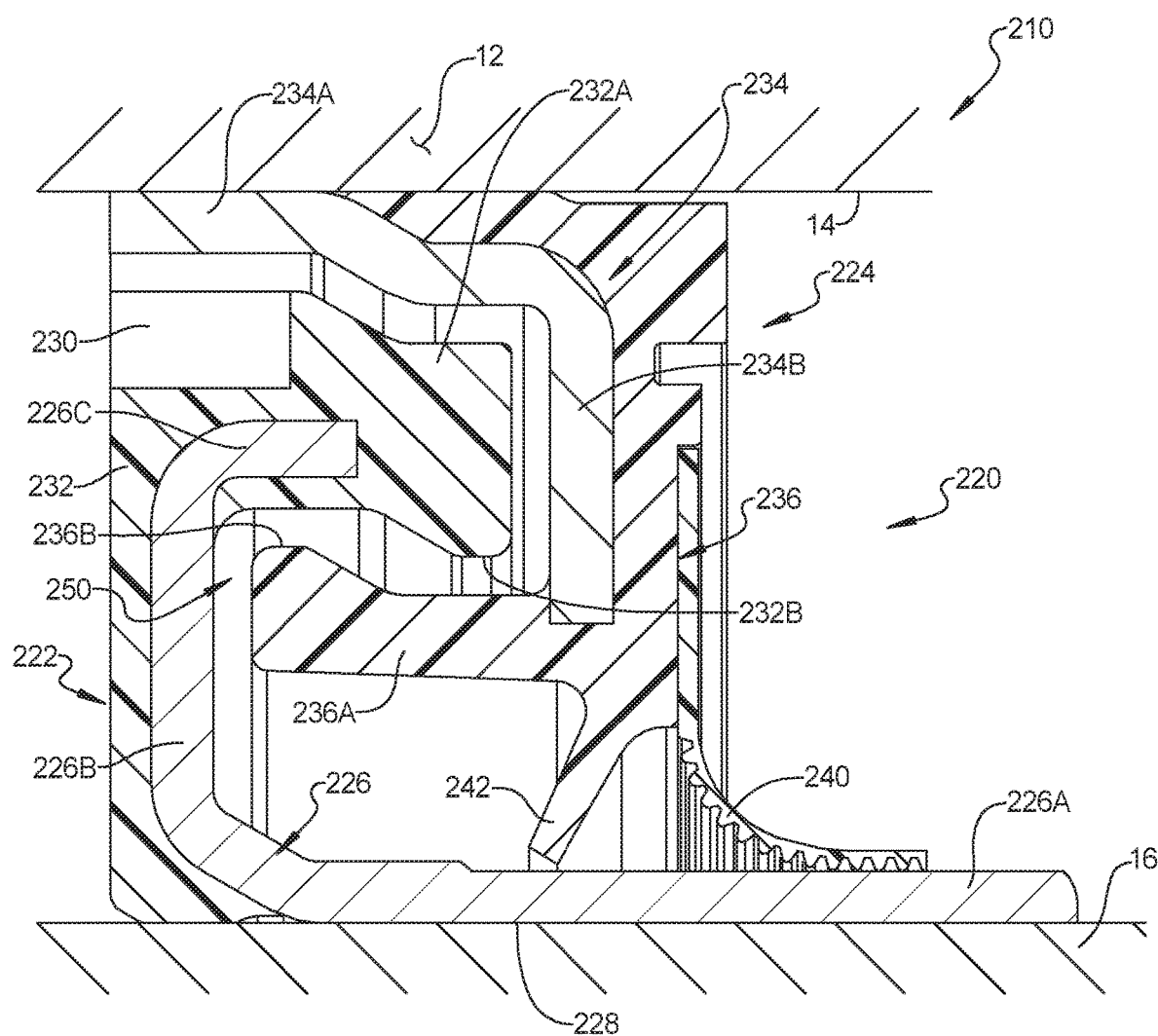
FIG. 5 is a cross-sectional view of a radial shaft seal arrangement with dynamic exclusion of contamination according to a second embodiment.
Figure 6:
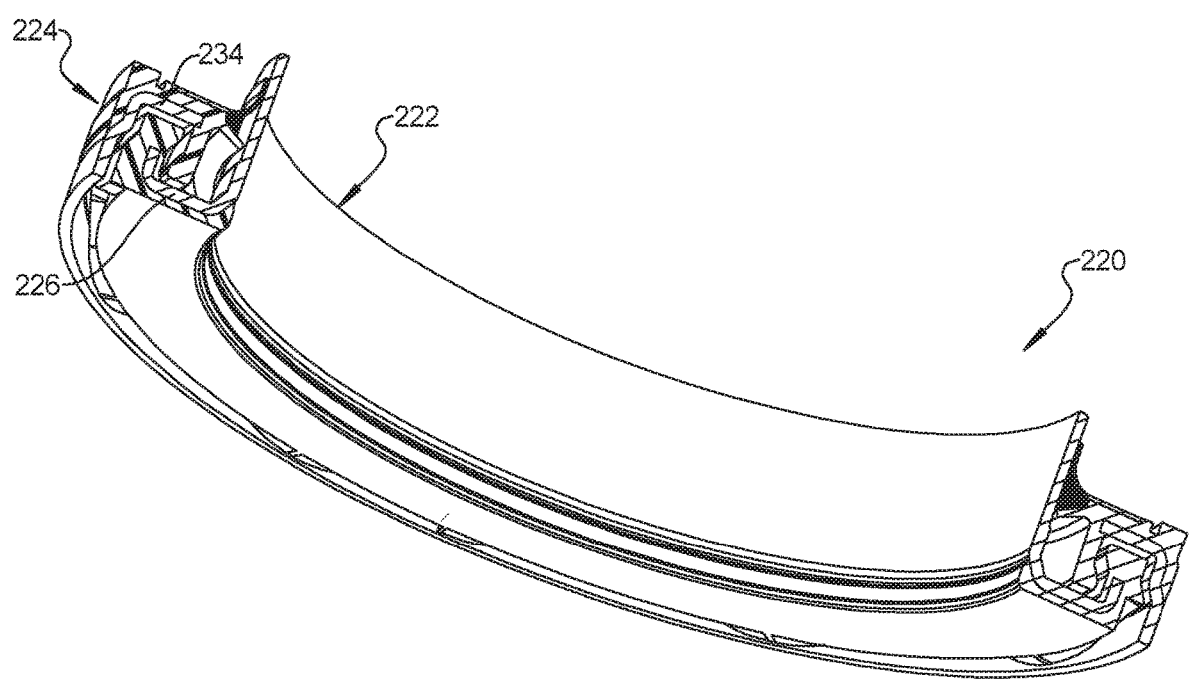
FIG. 6 is a perspective partial cross-sectional view of the radial shaft seal shown in FIG. 5.

With reference to FIGS. 5 and 6, an alternative sealing arrangement 210 is shown including a housing 12 defining a bore 14 and a shaft 16 received within the bore 14. A seal assembly 220 is disposed in a gap between the shaft 16 and the bore 14. The seal assembly 220 includes an inner annular sealing member 222 and an outer annular sealing member 224.

The inner annular sealing member 222 includes a metal insert 226 having an inner surface 228 press fit on the shaft 16. The metal insert 226 can include a first cylindrical portion 226A, a radially outwardly extending step region 226B and a second cylindrical portion 226C extending axially from an outer end of the radially outwardly extending step region 226B in a same direction as the first cylindrical portion 226A. A plurality of radially outwardly projecting fins 230 are provided on an outer surface of the second cylindrical portion 226C. The radially outwardly projecting fins 230 can be formed by an elastomeric over mold 232 provided on the second cylindrical portion 226C. The elastomeric over mold 232 can include an axially extending portion 232A extending beyond an end of the second cylindrical portion 226C of the metal insert 226. The axially extending portion 232A can include a radially inwardly extending annular rim 232B extending from an axial end of the axially extending portion 232A. The radially inwardly extending annular rim 232B can have an innermost diameter.

The outer annular sealing member 224 can include a metal insert 234 having a cylindrical portion 234A that can be press fit within the bore 14 of the housing 12. A radially inwardly extending portion 234B can extend radially inward from an end of the cylindrical portion 234A and can support a seal body 236 having one or more seal lips 240, 242 that sealingly engage an outer surface of the first cylindrical portion 226A of the inner annular sealing member 222. The cylindrical portion 234A of the outer annular sealing member 224 can be disposed directly radially outward of and spaced from the radially outwardly projecting fins 230 of the inner annular sealing member 222. The seal body 236 can be made from an elastomer that is over-molded on the metal insert 234 and can include a dust lip 242 integrally formed therewith and a main seal lip 240 formed as a disk-shape and adhered to or otherwise bonded or connected to the seal body 236 and including spiral grooves on a lay-down surface that engages the first cylindrical portion 226A. The main seal lip 240 can be made from PTFE or other material. Alternatively, the main seal lip 240 can be integrally formed with the seal body 236. The elastomeric over mold 236 can include an axially extending portion 236A extending axially from an inner end of the radially inwardly extending portion 234B of the metal insert 234 and spaced radially inward of the axially extending portion 232A of the inner annular sealing member 222. The axially extending portion 236A can include a radially outwardly extending annular rim 236B extending from an axial end of the axially extending portion 236A. The radially outwardly extending annular rim 236B can have an outermost diameter that is larger the innermost diameter of the radially inwardly extending annular rim 232B so that there is an interference engagement between the radially inwardly extending annular rim 232B and the radially outwardly extending annular rim 236B.

When the shaft 16 rotates, the radially outwardly projecting fins 230 pro-actively/dynamically move air, contamination, particles, fluids etc. axially away from the sealing area. The axially extending portion 232A of the inner annular sealing member 222 and the axially extending portion 236A of the outer annular sealing member 224 define a labyrinth structure 250 that is enhanced by the interference engagement between the radially inwardly extending annular rim 232B and the radially outwardly extending annular rim 236B. The labyrinth structure 250 is disposed between the radially outwardly projecting fins 230 and the seal lips 240, 242. It should be understood that the seal body 236, the seal lips 240, 242 and the labyrinth structure 250 can take on other forms.

Figure 7:
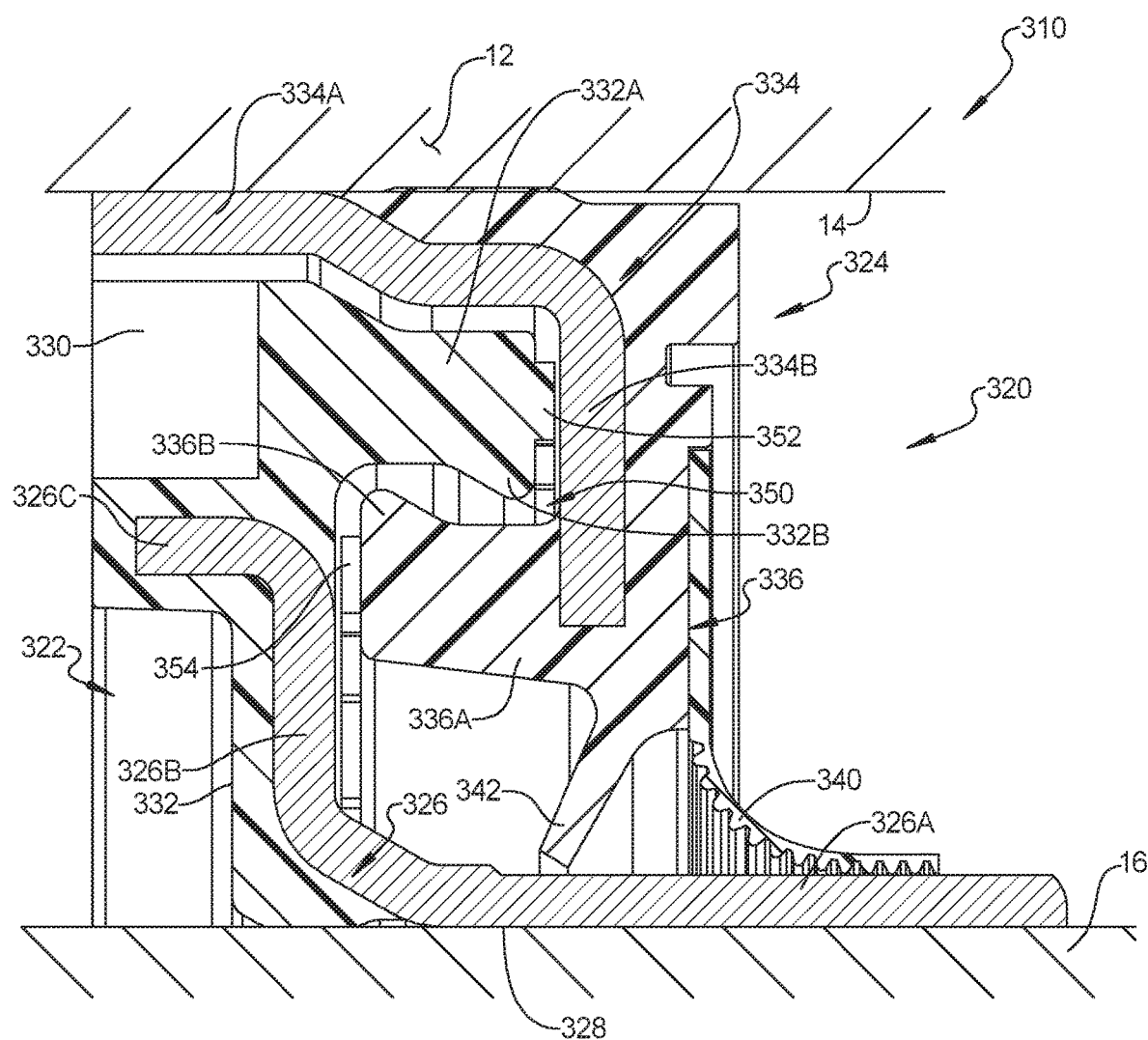
FIG. 7 is a cross-sectional view of a radial shaft seal arrangement with dynamic exclusion of contamination according to a third embodiment.
Figure 8:
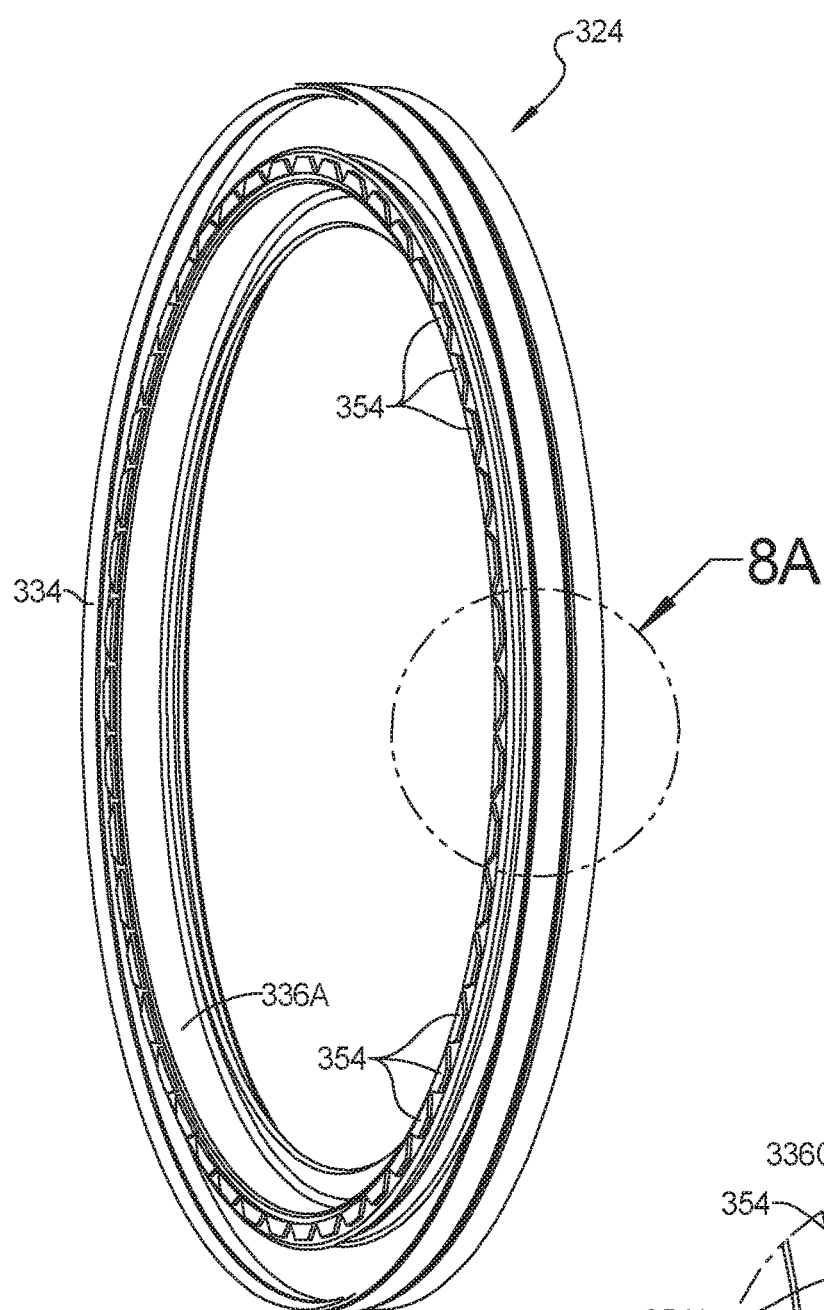
FIGS. 8 and 8A are perspective views of the radial shaft seal shown in FIG. 7.
Figure 8A:
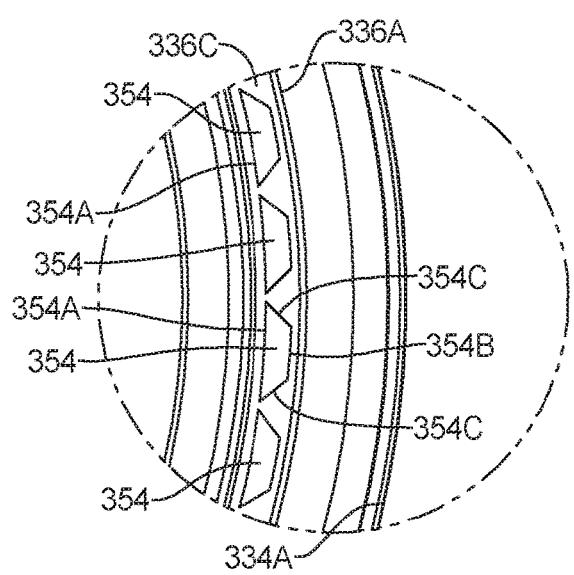

With reference to FIGS. 7 and 8, a sealing arrangement 310 is shown including a housing 12 defining a bore 14 and a shaft 16 received within the bore 14. A seal assembly 320 is disposed in a gap between the shaft 16 and the bore 14. The seal assembly 320 includes an inner annular sealing member 322 and an outer annular sealing member 324.

The inner annular sealing member 322 includes a metal insert 326 having an inner surface 328 press fit on the shaft 16. The metal insert 326 can include a first cylindrical portion 326A, a radially outwardly extending step region 326B and a second cylindrical portion 326C extending axially from an outer end of the radially outwardly extending step region 326B in an opposite direction than the first cylindrical portion 326A. A plurality of radially outwardly projecting fins 330 are provided on an outer surface of the second cylindrical portion 326C. The radially outwardly projecting fins 330 can be formed by an elastomeric over mold 332 provided on the second cylindrical portion 326C. The elastomeric over mold 332 can include an axially extending portion 332A extending axially in a same direction as the first cylindrical portion 326A. The axially extending portion 332A can include a radially inwardly extending annular rim 332B extending from an axial end of the axially extending portion 332A. The radially inwardly extending annular rim 332B can have an innermost diameter.

The outer annular sealing member 324 can include a metal insert 334 having a cylindrical portion 334A that can be press fit within the bore 14 of the housing 12. A radially inwardly extending portion 334B can extend radially inward from an end of the cylindrical portion 334A and can support a seal body 336 having one or more seal lips 340, 342 that sealingly engage an outer surface of the first cylindrical portion 326A of the inner annular sealing member 322. The cylindrical portion 334A of the outer annular sealing member 324 can be disposed directly radially outward of and spaced from the radially outwardly projecting fins 330 of the inner annular sealing member 322. The seal body 336 can be made from an elastomer that is over-molded on the metal insert 334 and can include a dust lip 342 integrally formed therewith and a main seal lip 340 formed as a disk-shape and adhered to the seal body 336 and including spiral grooves on a lay-down surface that engages the first cylindrical portion 326A. The main seal lip 340 can be made from PTFE or other material. Alternatively, the main seal lip 340 can be integrally formed with the seal body 336. The elastomeric over mold 336 can include an axially extending portion 336A extending axially from an inner end of the radially inwardly extending portion 334B of the metal insert 334 and spaced radially inward of the axially extending portion 332A of the inner annular sealing member 322. The axially extending portion 336A can include a radially outwardly extending annular rim 336B extending from an axial end of the axially extending portion 336A. The radially outwardly extending annular rim 336B can have an outermost diameter that is larger the innermost diameter of the radially inwardly extending annular rim 332B so that there is an interference engagement between the radially inwardly extending annular rim 332B and the radially outwardly extending annular rim 336B.

When the shaft 16 rotates, the radially outwardly projecting fins 330 pro-actively/dynamically move air, contamination, particles, fluids etc. axially away from the sealing area. The axially extending portion 332A of the inner annular sealing member 322 and the axially extending portion 336A of the outer annular sealing member 324 define a labyrinth structure 350 that is enhanced by the interference engagement between the radially inwardly extending annular rim 332B and the radially outwardly extending annular rim 336B. The labyrinth structure 350 is disposed between the radially outwardly projecting fins 330 and the seal lips 340, 342. It should be understood that the seal body 336, the seal lips 340, 342 and the labyrinth structure 350 can take on other forms. In addition, the axially extending portion 332A of the inner annular sealing member 322 and the axially extending portion 336A of the outer annular sealing member 324 each include an end face 332C, 336C that can be provided with exclusionary features 352, 354, respectively. Exemplary exclusionary features 352, 354 are shown in FIG. 8. The exclusionary features 352, 354 protrude from the end faces 332C, 336C and can be formed to define a plurality of narrowing restrictions between adjacent ones of the protruding exclusionary features 352, 354. Debris and fluids that enter the space between the inner and outer annular sealing members 322, 324 can be prevented from passing by the exclusionary features 352 and are expelled away from the exclusionary members 352 by angled side surfaces that deflect the debris and fluids away from seal lips 340, 342. The protruding exclusionary features 352, 354 can be polygonal in shape with an inner edge surface 354A that is wider than an outer edge surface 354B. The polygonal shape of the exclusionary members 352, 354 can include tapered sided edge surfaces 354C that define the narrowing restrictions between adjacent ones of the protruding exclusionary features 352, 354.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing arrangement, comprising:
a housing including a bore;
a shaft extending through the bore in the housing;
an inner annular sealing member having an inner surface press fit on the shaft and having a plurality of radially outwardly projecting fins on a first outer surface;
an outer annular sealing member press fit in the bore and having a first end supporting a seal lip that sealingly engages a second outer surface of the inner annular sealing member, the outer annular sealing member having a second end that is disposed directly radially outward of and spaced from the radially outwardly projecting fins of the inner annular sealing member;
further comprising a labyrinth structure defined by the inner annular sealing member and the outer annular sealing member and disposed between the radially outwardly projecting fins and the seal lip, wherein the labyrinth structure includes a first axially protruding annular portion extending from a seal body of the outer annular sealing member and a second axially protruding annular portion extending from the inner annular sealing member, wherein the first axially protruding annular portion is disposed directly radially inward from the second axially protruding annular portion, wherein an axial end face of the first axially protruding annular portion includes a plurality of circumferentially spaced, axially protruding exclusionary members.

2. The sealing arrangement according to claim 1, wherein adjacent ones of the plurality of exclusionary members define a narrowing restriction therebetween.

3. A sealing arrangement, comprising:
a housing including a bore;
a shaft extending through the bore in the housing;
an inner annular sealing member having an inner surface press fit on the shaft and having a plurality of radially outwardly projecting fins on a first outer surface;
an outer annular sealing member press fit in the bore and having a first end supporting a seal lip that sealingly engages a second outer surface of the inner annular sealing member, the outer annular sealing member having a second end that is disposed directly radially outward of and spaced from the radially outwardly projecting fins of the inner annular sealing member;
further comprising a labyrinth structure defined by the inner annular sealing member and the outer annular sealing member and disposed between the radially outwardly projecting fins and the seal lip, wherein the labyrinth structure includes a first axially protruding annular portion extending from a seal body of the outer annular sealing member and a second axially protruding annular portion extending from the inner annular sealing member, wherein the first axially protruding annular portion is disposed directly radially inward from the second axially protruding annular portion, wherein an axial end face of the second axially protruding annular portion includes a plurality of circumferentially spaced, axially protruding exclusionary members.

4. The sealing arrangement according to claim 1, wherein the seal lip is formed from PTFE.

5. The sealing arrangement according to claim 4, wherein the seal lip includes a spiral groove in a laydown surface of the seal lip.

6. The sealing arrangement according to claim 3, further comprising a dust lip adjacent to the seal lip.

7. A sealing arrangement, comprising:
a housing including a bore;
a shaft extending through the bore in the housing;
an inner annular sealing member having an inner surface press fit on the shaft;

an outer annular sealing member press fit in the bore and having a first end supporting a seal lip that sealingly engages an outer surface of the inner annular sealing member; and a labyrinth structure defined by the inner annular sealing member and the outer annular sealing member, wherein the labyrinth structure includes a first axially protruding annular portion extending from a seal body of the outer annular sealing member and a second axially protruding annular portion extending from the inner annular sealing member, wherein the first axially protruding annular portion is disposed radially inward from the second axially protruding annular portion, wherein an axial end face of the first axially protruding annular portion includes a plurality of circumferentially spaced, axially protruding exclusionary members.

8. The sealing arrangement according to claim 7, wherein the first axially protruding annular portion includes a radially outwardly extending annular rim having an outermost surface with a first diameter and the second axially protruding annular portion includes a radially inwardly extending annular rim having an innermost surface with a second diameter smaller than the first diameter.

9. The sealing arrangement according to claim 7, wherein adjacent ones of the plurality of exclusionary members define a narrowing restriction therebetween.

10. The sealing arrangement according to claim 7, wherein an axial end face of the second axially protruding annular portion includes a plurality of circumferentially spaced, axially protruding exclusionary members.

* * * * *

UNITED STATES PATENT AND TRADEMARK OFFICE
CERTIFICATE OF CORRECTION

PATENT NO. : 10,955,006 B2
APPLICATION NO. : 15/993096
DATED : March 23, 2021
INVENTOR(S) : Robert P. Laplante Page 1 of 1

It is certified that error appears in the above-identified patent and that said Letters Patent is hereby corrected as shown below:

In the Claims

Column 8, Claim 4, Line 56, delete "claim 1," and insert --claim 3,-- therefor

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*